US012798291B2

(12) United States Patent
Fujita et al.

(10) Patent No.: US 12,798,291 B2
(45) Date of Patent: Nov. 17, 2026

(54) VEHICLE WHEEL SUPPORT DEVICE

(71) Applicant: TOYOTA JIDOSHA KABUSHIKI KAISHA, Toyota (JP)

(72) Inventors: Hironori Fujita, Toyota (JP); Hirotaka Ikegami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 18/776,596

(22) Filed: Jul. 18, 2024

(65) Prior Publication Data

US 2025/0100326 A1 Mar. 27, 2025

(30) Foreign Application Priority Data

Sep. 22, 2023 (JP) ................................ 2023-158458

(51) Int. Cl.
*B60B 27/00* (2006.01)

(52) U.S. Cl.
CPC .......... *B60B 27/0073* (2013.01); *B60B 27/00* (2013.01); *B60B 27/0068* (2013.01); *B60B 27/0005* (2013.01); *B60B 2900/511* (2013.01)

(58) Field of Classification Search
CPC ........................ B60B 27/0073; B60B 27/0063
See application file for complete search history.

(56) References Cited

U.S. PATENT DOCUMENTS

| | | | | |
|---|---|---|---|---|
| 9,796,212 B2 * | 10/2017 | Nakamura | F16C 41/007 | |
| 11,745,539 B2 * | 9/2023 | Duch | B60B 27/0073 | 277/351 |
| 2004/0197039 A1 * | 10/2004 | Sakamoto | G01D 11/24 | 384/448 |
| 2021/0115969 A1 * | 4/2021 | Hubert | H02J 50/70 | |
| 2025/0100324 A1 * | 3/2025 | Fujita | B60B 27/0005 | |
| 2025/0100325 A1 * | 3/2025 | Fujita | B60B 27/0015 | |

FOREIGN PATENT DOCUMENTS

| | | | | |
|---|---|---|---|---|
| JP | 2012121390 | * | 6/2012 | B60B 27/0068 |
| JP | 2015-71339 A | | 4/2015 | |
| JP | 2020-003055 A | | 1/2020 | |

* cited by examiner

*Primary Examiner* — Jason R Bellinger
(74) *Attorney, Agent, or Firm* — Sughrue Mion, PLLC

(57) ABSTRACT

A vehicle wheel support device includes: a hub bearing that rotatably supports a wheel of a vehicle; a hub carrier that supports the hub bearing; a sensor that detects a rotation state of the wheel of the vehicle; and a cap which prevents entry of foreign matter into the hub bearing and with which is formed integrally a deflector member including at least part of a deflector that isolates the sensor from the foreign matter.

13 Claims, 13 Drawing Sheets

VEHICLE WHEEL SUPPORT DEVICE

REFERENCE TO RELATED APPLICATIONS

This application claims priority from Japanese Patent Application No. 2023-158458 filed on Sep. 22, 2023. The entire content of the priority application is incorporated herein by reference.

TECHNICAL FIELD

The following disclosure relates to a vehicle wheel support device.

BACKGROUND ART

For instance, an arrangement of a knuckle (as one form of a hub carrier), a hub bearing, a drive shaft, and a deflector disclosed in Japanese Patent Application Publication No. 2015-071339 is conventionally known. The conventional arrangement is an arrangement in a driving wheel in which the drive shaft is connected to a rotary body of the hub bearing supported by a hub carrier. In this arrangement, the deflector is fixed to the drive shaft.

SUMMARY

On a driving wheel side, a sensor for detecting a rotation state of a wheel may be fixed to the hub carrier. The hub carrier is disposed in an environment in which foreign matter such as water, sand, or mud is likely to enter an inside of the hub carrier in accordance with traveling of the vehicle especially from an inner side of the vehicle in the left-right direction of the vehicle, i.e., a side opposite to an outer side of the vehicle on which the wheel is connected to the rotary body. Thus, the sensor fixed to the hub carrier is disposed in an environment in which the foreign matter is likely to adhere.

The sensor is required to maintain good detection accuracy even in the environment in which the foreign matter is likely to adhere. Thus, the deflector provided for the driving wheel is fixed to the drive shaft that is disposed inner than the hub carrier in the left-right direction of the vehicle, for preventing the foreign matter from adhering to the sensor that is disposed so as to face the hub bearing.

Also in a driven wheel that does not include a drive shaft, it is necessary to prevent the foreign matter from adhering to the sensor and to detect the rotation state of the wheel with good detection accuracy. In the driven wheel, however, the deflector cannot be fixed to the drive shaft described above.

In a case where the sensor is fixed to the hub carrier in the driven wheel as in the driving wheel, a hub carrier dedicated to the driven wheel may be used. In this case, the dedicated hub carrier is configured such that an accommodation hole portion, in which the hub bearing is accommodated, is closed at one end thereof on the vehicle inner side. Thus, in a case where the dedicated hub carrier is used in the driven wheel, the accommodating hole portion is closed to thereby prevent the foreign matter from adhering to the sensor.

In a case where the dedicated hub carrier is not used, a cap for protecting an internal structure of the hub bearing such as an outer ring, rolling balls, and an inner ring may be provided. In this case, at least a detection portion of the sensor is embedded in the cap such that the detection portion enters the inside of the cap. When the cap is thus provided, the sensor is embedded in the cap, so that the foreign matter is prevented from adhering to the sensor.

To prevent the foreign matter from adhering to the sensor, specifications of the hub carrier may be different between the driving wheel side and the driven wheel side. When the sensor is fixed to the hub carrier on the driving wheel side and the sensor is fixed to the cap on the driven wheel side, the specifications of the hub carrier and the sensor are different between the driving wheel side and the driven wheel side, and specifications of a wire harness, a connector, etc., connected to the sensor are also different between the driving wheel side and the driven wheel side. That is, it is necessary in the conventional configuration to produce and manage the hub carrier, the sensor, the wire harness, and the connector as different components between the driving wheel side and the driven wheel side, and it is necessary to separately perform different assembly operations between the driving wheel side and the driven wheel side. Thus, there still remains room for improvement in terms of achieving commonality of components while preventing adhesion of the foreign matter to the sensor.

Accordingly, an aspect of the present disclosure is to provide a vehicle wheel support device capable of achieving commonality of components.

In one aspect of the present disclosure, a vehicle wheel support device includes: a hub bearing that rotatably supports a wheel of a vehicle; a hub carrier that supports the hub bearing; a sensor that detects a rotation state of the wheel; and a cap which prevents entry of the foreign matter into the hub bearing and with which is formed integrally a deflector member including at least part of a deflector that isolates the sensor from the foreign matter.

According to the vehicle wheel support device of the present disclosure, the deflector can be formed integrally with the cap. That is, the cap has the function of the deflector. Thus, even in the driven wheel that does not include the drive shaft, the cap having the function of the deflector can isolate the detection portion of the sensor from the foreign matter. Therefore, the cap prevents the foreign matter from adhering to the sensor. Since the cap having the function of the deflector prevents the foreign matter from adhering to the sensor, the sensor can be fixed to the hub carrier also in the driven wheel. According to the vehicle wheel support device of the present disclosure, the hub carrier, the sensor, the wire harness, and the connector can be used in common between the driving wheel and the driven wheel.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which.

DESCRIPTION

Figure 1:
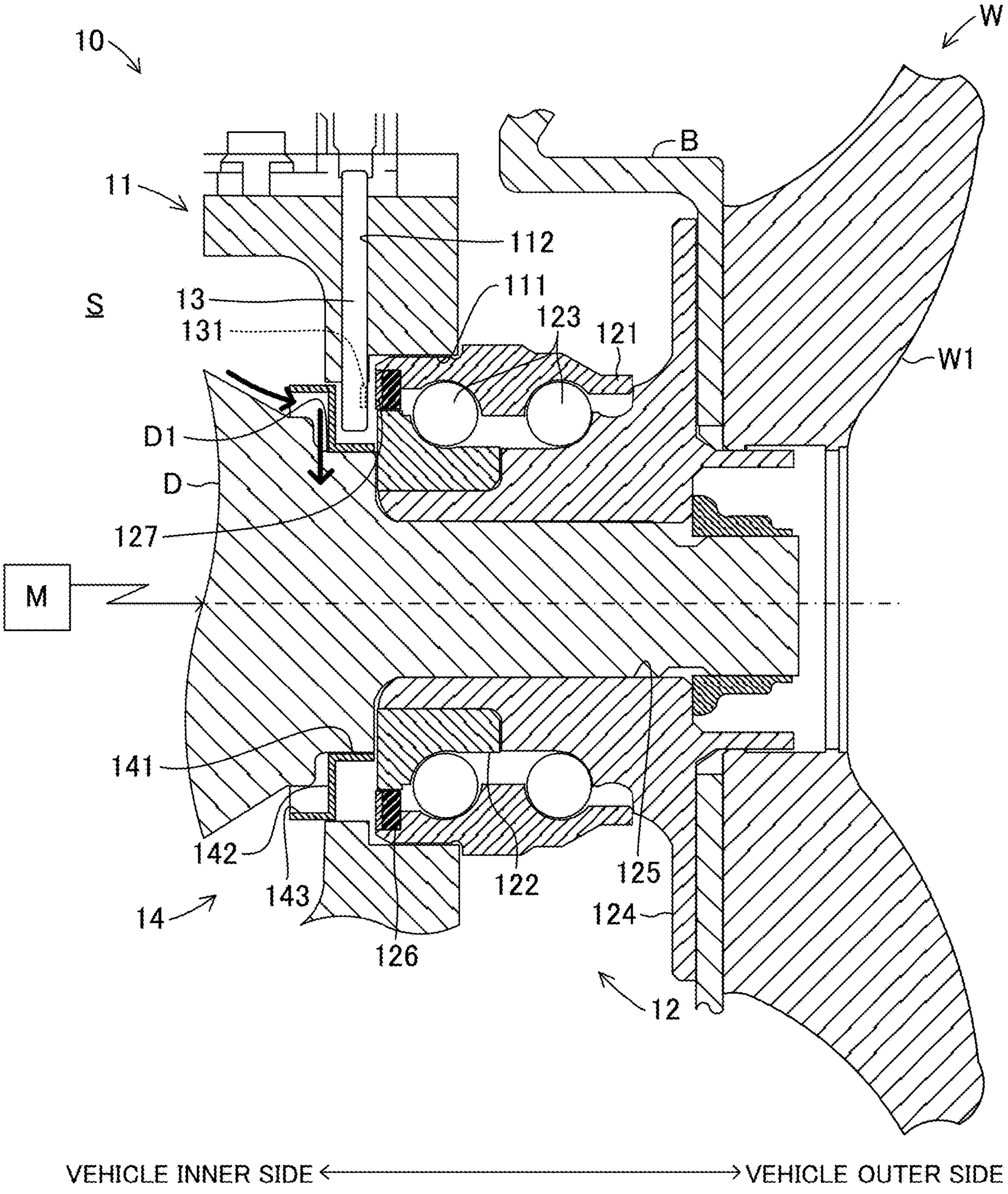
FIG. 1 is a schematic view of a vehicle wheel support device in a driving wheel.

Referring to the drawings, there will be hereinafter described in detail a vehicle wheel support device according to an embodiment of the present disclosure.

Figure 2:
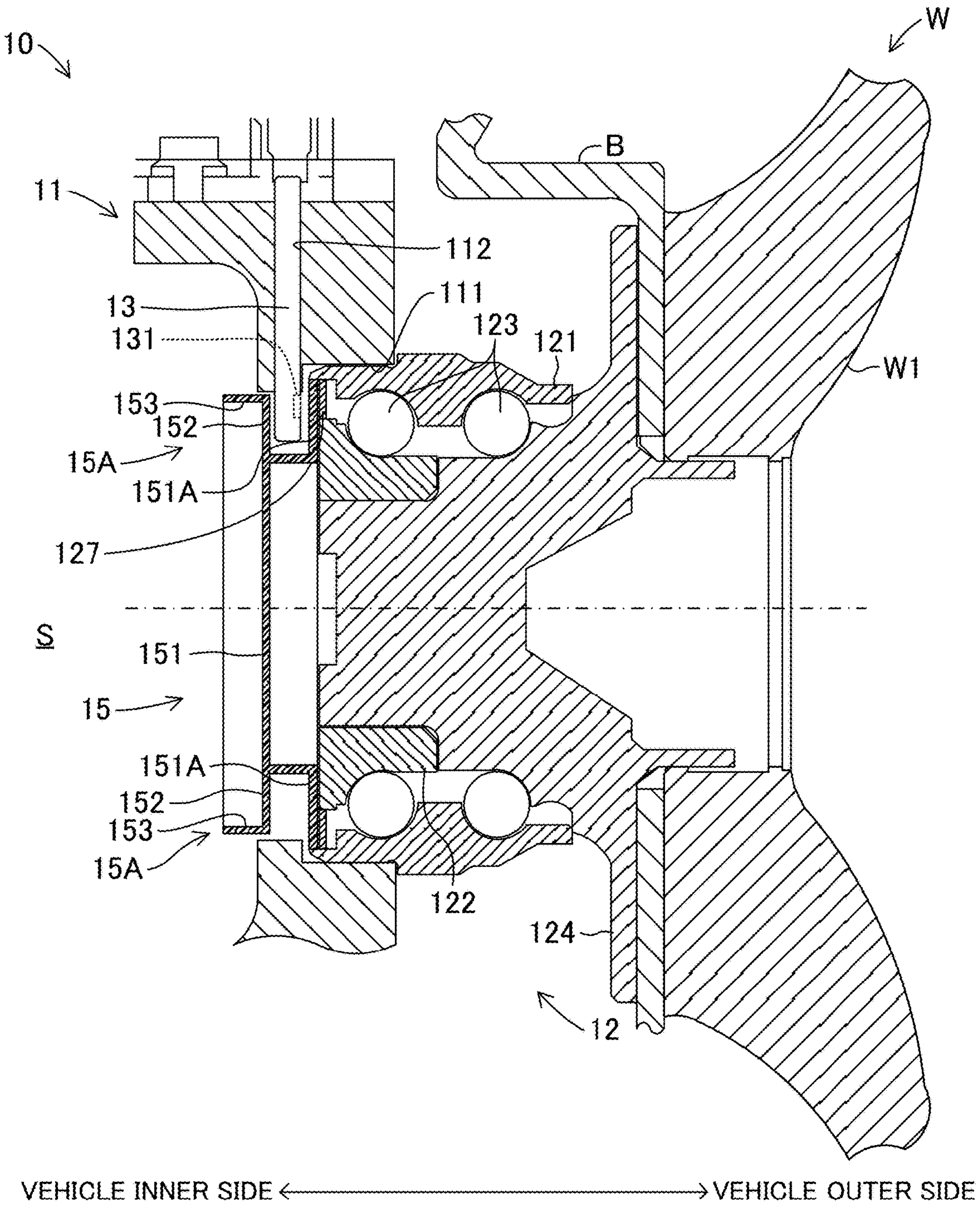
FIG. 2 is a schematic view of a vehicle wheel support device in a driven wheel.

As illustrated in FIGS. 1 and 2, a vehicle wheel support device 10 of the present embodiment includes a hub carrier 11 and a hub bearing 12. The vehicle wheel support device 10 includes a sensor 13 and a deflector 14 or a cap 15.

The hub carrier 11 includes an accommodation hole portion 111 in which part of the hub bearing 12 is accommodated. The hub carrier 11 supports the hub bearing 12 in a state in which the hub carrier 11 is accommodated in the accommodation hole portion 111. Here, the hub carrier 11 may be referred to as a "knuckle" when the hub carrier 11 is provided for a steerable wheel of a vehicle. In the following description, the hub carrier 11 is referred to as a "hub carrier 11" regardless of whether the hub carrier 11 is provided for the steerable wheel or the non-steerable wheel.

The hub carrier 11 includes a fixing portion 112 in which a rod-shaped sensor 13 (that will be described later) is fitted such that the sensor 13 is fixed in a state in which a distal end portion of the sensor 13 protrudes from an inner circumferential surface of the accommodation hole portion 111. The sensor 13 will be also referred to as a "stick sensor 13". In this configuration, when the stick sensor 13 is fixed to the fixing portion 112, a detection portion 131 provided at the distal end portion of the stick sensor 13 protrudes from the inner circumferential surface of the accommodation hole portion 111.

The hub bearing 12 includes an outer ring 121, an inner ring 122, rolling balls 123, and a hub shaft 124. Here, the inner ring 122 and the hub shaft 124 constitute a "rotary body". In the present embodiment, the hub bearing 12 includes the rolling balls 123. However, the hub bearing 12 may include rolling rollers, for instance, instead of the rolling balls 123.

The outer ring 121 is fixed to the hub carrier 11 by bolts or the like (not illustrated). The inner ring 122 cooperates with an inner circumferential surface of the outer ring 121 to roll the rolling balls 123 located on one side. The hub shaft 124 is connected to the inner ring 122 and cooperates with the inner circumferential surface of the outer ring 121 to roll the rolling balls 123 located on the other side.

At a distal end portion of the hub shaft 124 on the outer side in the left-right direction of the vehicle (i.e., on the outer side of the vehicle in the width direction of the vehicle), a wheel W1 that constitutes a wheel W is fastened by bolts and nuts (not illustrated) with a brake disc B sandwiched therebetween. Thus, the hub bearing 12 rotatably supports the wheel W (the wheel W1) via the inner ring 122 and the hub shaft 124, which constitute the rotary body.

As illustrated in FIG. 1, the vehicle wheel support device 10 includes a drive shaft D in a case where the vehicle wheel support device 10 supports the wheel driven by a driving force source M such as a motor or an internal combustion engine mounted on the vehicle, that is, in a case where the vehicle wheel support device 10 supports a driving wheel. In this case, the drive shaft D is coupled at one end thereof to the driving force source M and at the other end thereof to the hub shaft 124 that constitutes the rotary body of the hub bearing 12.

In this case, the hub bearing 12 constitutes part of the driving wheel. The present embodiment exemplifies a case in which the drive shaft D is coupled to the hub shaft 124. Since the inner ring 122 and the hub shaft 124 are coupled to each other, however, the drive shaft D may be coupled to the inner ring 122, for instance.

The hub shaft 124 on the driving wheel side has, at a central portion thereof, a spline hole 125 in which the drive shaft D is disposed for enabling the driving force to be transmitted from the driving force source M. In this configuration, the hub shaft 124 and the drive shaft D are held in a spline engagement, so that the hub shaft 124 on the driving wheel side transmits the driving force from the driving force source M to the wheel W1, namely, the wheel W.

Further, the hub bearing 12 on the driving wheel side is provided with an annular seal 126 for isolating the inside of the hub bearing 12 from a space S into which foreign matter such as water, sand, and mud are allowed to enter. That is, the annular seal 126 prevents the foreign matter from entering between the outer ring 121 and the inner ring 122, so that the foreign matter does not hinder the rolling of the rolling balls 123. Thus, the inner structure of the hub bearing 12 on the driving wheel side is protected by the annular seal 126.

The present embodiment exemplifies, as the space S, a space in a tire housing in which the wheel W of the vehicle is housed, which space is located on the vehicle inner side (i.e., the inner side of the vehicle in the vehicle width direction) of the wheel W1, i.e., the wheel W. Specifically, the space S is exemplified as a space in the tire housing located on the vehicle inner side of one end portion of the hub bearing 12 that is accommodated in the accommodation hole portion 111 of the hub carrier 11. The foreign matter present on the road surface is allowed to enter the space S by being raised up due to rotation of the wheel W during traveling of the vehicle.

On the other hand, as illustrated in FIG. 2, the vehicle wheel support device 10 does not include the drive shaft D in a case where the vehicle support device 10 supports a wheel that is not driven by the driving force source M, namely, in a case where the vehicle support device 10 supports a driven wheel. In this case, the hub bearing 12 is not coupled to the drive shaft D. Accordingly, the hub shaft 124 on the driven wheel side is formed so as to be solid without including the spline hole 125. Thus, the hub bearing 12 constitutes part of the driven wheel in this case.

A cap 15, which will be described later, is liquid-tightly attached to the hub bearing 12 provided on the driven wheel side so as to isolate the inside of the hub bearing 12 from the space S into which the foreign matter is allowed to enter. That is, the cap 15 prevents the foreign matter from entering between the outer ring 121 and the inner ring 122, so that the foreign matter does not hinder the rolling of the rolling balls 123. Thus, the inner structure of the hub bearing 12 on the driven wheel side is protected by the cap 15.

As illustrated in FIGS. 1 and 2, the hub bearing 12 is provided with a magnetized pulsar ring 127. The magnetized pulsar ring 127 is a multipolar magnet in which N poles and S poles are radially and alternately magnetized on an annular base. The magnetized pulsar ring 127 is disposed on the vehicle inner side of the hub bearing 12. More specifically, the magnetized pulsar ring 127 is disposed toward the inside of the accommodation hole portion 111 of the hub carrier 11.

More specifically, on the driving wheel side, the magnetized pulsar ring 127 is disposed on the vehicle inner side of the annular seal 126, as illustrated in FIG. 1. Thus, on the driving wheel side, the magnetized pulsar ring 127 directly faces the detection portion 131 of the stick sensor 13. On the driven wheel side, the magnetized pulsar ring 127 is disposed on the vehicle outer side of the cap 15 attached to the hub bearing 12, namely, on the inner side of the cap 15, as illustrated in FIG. 2. Thus, on the driven wheel side, the magnetized pulsar ring 127 faces the detection portion 131 of the stick sensor 13 via the cap 15.

The sensor 13 detects a rotation state of the inner ring 122 or the hub shaft 124 constituting the rotary body of the hub bearing 12. As illustrated in FIGS. 1 and 2, the sensor 13 of the present embodiment detects the rotation state of the inner ring 122 constituting the rotary body of the hub bearing 12 about the axis of the inner ring 122, in other words, the rotation state of the wheel W. As the sensor 13, a wheel speed sensor that detects a wheel speed is exemplified. In the following description, the sensor 13 is a wheel speed sensor. The sensor 13 may be a sensor that detects another physical quantity.

As illustrated in FIGS. 1 and 2, the stick sensor 13 includes, at its distal end portion, the detection portion 131 that detects the rotation state. The detection portion 131 protrudes from the inner circumferential surface of the accommodation hole portion 111 in a state in which the stick sensor 13 is fixed to the fixing portion 112 of the hub carrier 11. The detection portion 131 faces the magnetized pulsar ring 127 provided on the hub bearing 12 with an air gap, which is a predetermined gap, interposed therebetween. Thus, the stick sensor 13 detects a change in the magnetic flux density and converts the detected change in the magnetic flux density to the rotational speed of the wheel W, namely, the wheel speed.

The deflector 14 is formed in an annular shape and is disposed so as to isolate, in the space S on the driving wheel side, the detection portion 131 of the stick sensor 13 that is fixed to the hub carrier 11. As illustrated in FIG. 1, the deflector 14 is fixed to a stepped portion D1 of the drive shaft D.

The deflector 14 is formed by a press work of a thin steel plate using a forming die, for instance. The deflector 14 may be formed by injection-molding of a resin material using a mold. The deflector 14 may be formed by welding various members formed by a press work.

Figure 3:
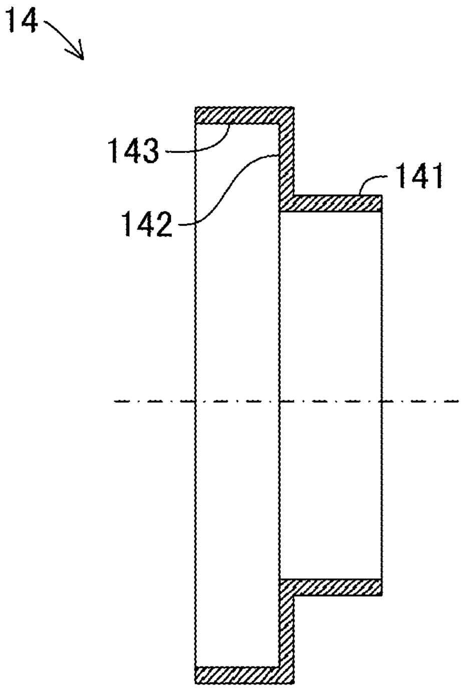
FIG. 3 is a view for explaining a configuration of a deflector.

As illustrated in FIGS. 1 and 3, the deflector 14 includes a cylindrical portion 141, a disk portion 142, and a repelling portion 143. In the deflector 14 of the present embodiment, the disk portion 142 extends radially outward from one end portion of the cylindrical portion 141 on the vehicle inner side, and the repelling portion 143 axially extends toward the vehicle inner side from an outer circumferential edge of the disk portion 142 located at a radially outward portion of the disk portion 142.

The cylindrical portion 141 has an inner diameter slightly smaller than an outer diameter of the stepped portion D1. That is, the inner diameter of the cylindrical portion 141 has a dimension with an interference such that the cylindrical portion 141 is fitted to the stepped portion D1. Thus, the cylindrical portion 141 is fitted to the stepped portion D1 or the cylindrical portion 141 is press-fitted to the stepped portion D1, for instance, so that the deflector 14 is fixed to the stepped portion D1.

The disk portion 142 is connected to the cylindrical portion 141 so as to extend therefrom in the radially outward direction. Thus, in a state in which the cylindrical portion 141 is fixed to the stepped portion D1, the disk portion 142 covers the side surface of the detection portion 131 of the stick sensor 13 so as to isolate the detection portion 131 in the space S on the driving wheel side. With this configuration, the disk portion 142 prevents the foreign matter scattered toward the detection portion 131 of the stick sensor 13 in the space S on the driving wheel side from adhering to the detection portion 131.

The repelling portion 143 is provided along the outer circumferential edge of the disk portion 142. The repelling portion 143 is connected to the disk portion 142 so as to axially extend therefrom, namely, so as to be coaxial with the cylindrical portion 141. With this configuration, the repelling portion 143 repels the foreign matter that enters from the space S on the driving wheel side toward the detection portion 131 of the stick sensor 13.

In the present embodiment, the deflector 14 includes the repelling portion 143. However, the repelling portion 143 may be omitted as necessary. In this case, the deflector 14 is constituted by the cylindrical portion 141 and the disk portion 142.

The cap 15 is formed in a disk shape and is attached to the hub bearing 12 on the driven wheel side. As illustrated in FIG. 2, the cap 15 prevents entry of the foreign matter into the hub bearing 12 from the space S on the driven wheel side. The cap 15 is disposed in the space S on the driven wheel side so as to isolate the detection portion 131 of the stick sensor 13 fixed to the hub carrier 11.

In the present embodiment, the cap 15 is formed by molding of a resin material. Specifically, in the present embodiment, the cap 15 is formed by injection molding in which a resin material is injected into a mold. Examples of the resin material for forming the cap 15 include polypropylene (PP), polyethylene (PE), polyamide (PA), polyvinyl chloride (PVC), and ABS resin (copolymer synthetic resin of acrylonitrile (A), butadiene (B), and styrene(S)). The cap 15 may be integrally formed by a press work of a thin steel plate using a forming die. The cap 15 may be formed by welding of members formed by a press work.

Figure 4:
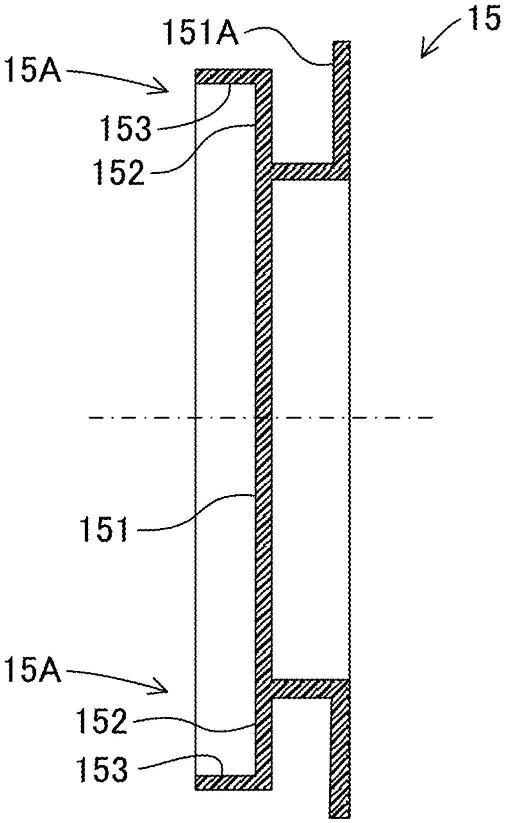
FIG. 4 is a view for explaining a configuration of a cap.

As illustrated in FIG. 4, the cap 15 includes a hat-shaped cap body 151, a disk portion 152 corresponding to the disk portion 142 of the deflector 14, and a repelling portion 153 corresponding to the repelling portion 143 of the deflector 14. That is, the cap 15 is an integral product in which the cylindrical portion 141 of the deflector 14 is changed to the cap body 151 and the disk portion 142 and the repelling portion 143, which are main portions of the deflector 14, are formed integrally with the cap body 151 as the disk portion 152 and the repelling portion 153.

That is, in the cap 15, a deflector member 15A including the disk portion 152 and the repelling portion 153, which are parts of the deflector 14, is formed integrally with the cap body 151. Thus, the cap 15 is formed integrally with the deflector member 15A, and it can be said that the cap 15 has a deflector function.

The cap body 151 has a flange-shaped large diameter portion 151A. The cap body 151, namely, the cap 15, is attached to the hub bearing 12 by fixing the large diameter portion 151A to the inner circumferential surface of the outer ring 121 of the hub bearing 12. Thus, the cap body 151 prevents entry of the foreign matter into the hub bearing 12 from the space S on the driven wheel side. In fixing the large diameter portion 151A to the outer ring 121 of the hub bearing 12, the large diameter portion 151A may be fitted in a groove (not illustrated) formed in the inner circumferential surface of the outer ring 121 along the circumferential direction, so as to be fixed to the outer ring 121.

The disc portion 152 of the deflector member 15A is formed so as to extend radially outward from one end portion of the cap body 151 on the vehicle inner side (FIG. 2). Thus, in a state in which the cap body 151 is attached to the hub bearing 12, the disk portion 152 covers the side surface of the detection portion 131 of the stick sensor 13 so as to isolate the detection portion 131 in the space S on the driven wheel side. With this configuration, the disk portion 152 prevents the foreign matter scattered toward the detection portion 131 of the stick sensor 13 in the space S on the driven wheel side from adhering to the detection portion 131.

The repelling portion 153 of the deflector member 15A extends axially toward the vehicle inner side (FIG. 2) from an outer circumferential edge of the disk portion 152 located at a radially outward portion of the disk portion 152. That is, the repelling portion 153 is formed so as to be coaxial with the cap body 151. With this configuration, the repelling portion 153 repels the foreign matter that enters from the space S on the driven wheel side toward the detection portion 131 of the stick sensor 13.

In the present embodiment, the deflector member 15A includes the repelling portion 153. However, the repelling portion 153 may be omitted as necessary. In this case, the deflector member 15A is constituted only by the disk portion 152.

In the vehicle wheel support device 10 configured as described above, the deflector 14 is press-fitted and fixed to the stepped portion D1 of the drive shaft D on the driving wheel side, as illustrated in FIG. 1. As indicated by bold arrows in FIG. 1, the deflector 14 prevents entry of the foreign matter scattered toward the detection portion 131 of the stick sensor 13 in the space S on the driving wheel side.

That is, the disk portion 142 and the repelling portion 143 of the deflector 14 hinder entry of the foreign matter and prevent the foreign matter from reaching the detection portion 131. With this configuration, on the driving wheel side, the foreign matter is unlikely to be present around the detection portion 131 of the stick sensor 13, particularly in the air gap between the detection portion 131 and the magnetized pulsar ring 127. It is thus possible to prevent the detection accuracy of the stick sensor 13 from deteriorating.

Figure 5:
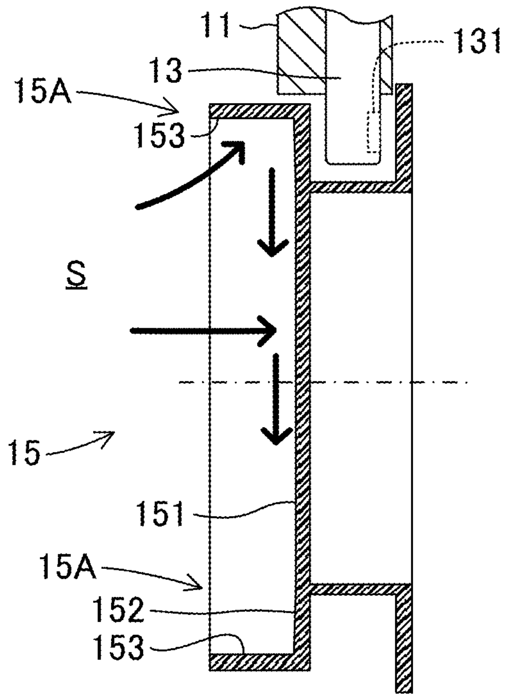
FIG. 5 is a view for explaining a state in which entry of foreign matter is prevented by the deflector on the driven wheel side.

In the vehicle wheel support device 10 on the driven wheel side, the cap 15 is attached to the hub bearing 12, as illustrated in FIG. 2. As indicated by bold arrows in FIG. 5, the cap body 151 of the cap 15 prevents the foreign matter from entering the hub bearing 12 from the space S on the driven wheel side, and the deflector member 15A of the cap 15 prevents entry of the foreign matter scattered toward the detection portion 131 of the stick sensor 13 in the space S on the driven wheel side.

Like the deflector 14 on the driving wheel side, the disk portion 152 and the repelling portion 153 that are formed integrally with the cap 15, namely, the deflector member 15A, hinders entry of the foreign matter and prevents the foreign matter from reaching the detection portion 131, also on the driven wheel side. Thus, on the driven wheel side, the foreign matter is unlikely to be present in the air gap formed between the detection portion 131 and the magnetized pulsar ring 127 via the large diameter portion 151A of the cap 15. As a result, it is possible to prevent the detection accuracy of the stick sensor 13 from deteriorating.

As can be understood from the above description, the vehicle wheel support device 10 includes the hub bearing 12 that rotatably supports the wheel W (the wheel W1), the hub carrier 11 that supports the hub bearing 12, the sensor 13 that detects the rotation state of the wheel W, and the cap 15 (the cap body 151) which prevents the foreign matter from entering the inside of the hub bearing 12 and in which the deflector member 15A (the disk portion 152 and the return portion 153) including at least part of the deflector 14 that isolates the sensor 13 from the foreign matter is integrally formed.

In this case, the hub bearing 12 includes the hub shaft 124 (including the connected inner ring 122) that is a rotary body connected to the wheel W (the wheel W1), and the hub carrier 11 includes the accommodation hole portion 111 that accommodates part of the hub bearing 12 and the fixing portion 112 to which the sensor 13 is fixed. The sensor 13 is fixed to the fixing portion 112 in a state in which the detection portion 131 that detects the rotation state of the inner ring 122 (including the connected hub shaft 124) about the axis of the inner ring 122 protrudes from the inner circumferential surface of the accommodation hole portion 111.

In this case, the hub shaft 124 (including the connected inner ring 122) and the drive shaft D that transmits the driving force from the driving force source M are coupled to each other to constitute part of the driving wheel that drives the wheel W (the wheel W1), or the hub shaft 124 (including the connected inner ring 122) and the drive shaft D are not connected to each other to constitute part of the driven wheel that follows the driving wheel. In the driving wheel, the deflector 14 is fixed to the drive shaft D, and in the driven wheel, the cap 15 is attached to the hub bearing 12.

In these cases, the cap 15 is formed using a resin material.

In this case, the cap 15 is formed by injection molding in which a resin material is injected into a mold.

Further, in these cases, each of the deflector 14 and the cap 15 has a repelling portion 153 formed at the outer circumferential edge thereof to repel the foreign matter entering from the space S toward the detection portion 131.

According to the vehicle wheel support device 10, the cap 15 is formed such that the disc portion 152 and the repelling portion 153 corresponding to the deflector 14 are formed integrally with the cap body 151 by injection molding of a resin material. Thus, the cap 15 has the function of the deflector 14.

In this configuration, even in the driven wheel that does not have the drive shaft D, the disk portion 152 and the repelling portion 153, which are formed integrally with the cap body 151 of the cap 15, can isolate the detection portion 131 of the sensor 13 in the space S in which entry of the foreign matter is allowed. Thus, the cap 15 can prevent the foreign matter from adhering to the sensor 13. Since the cap 15 can prevent the foreign matter from adhering to the sensor 13, the sensor 13 can be fixed to the hub carrier 11 also in the driven wheel. According to the vehicle wheel support device 10, the common hub carrier 11 can be employed in the driving wheel and the driven wheel, and the sensor 13, the wire harness, and the connector can be used in common.

There will be next described modifications of the embodiment illustrated above. Hereinafter, a first modification to a seventh modification will be described in order.

First Modification

Figure 6:
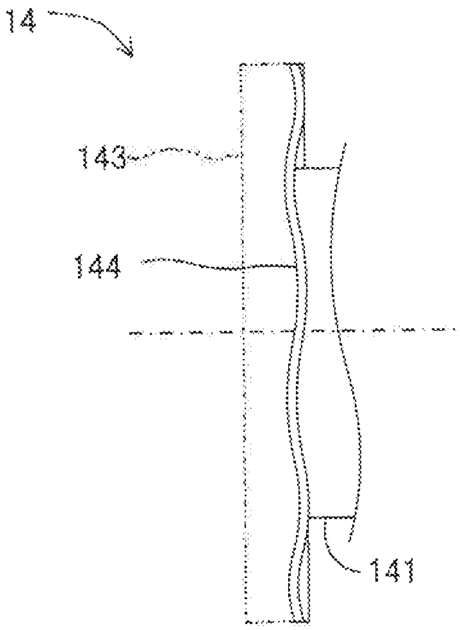
FIG. 6 is a view for explaining a configuration of a deflector or a cap according to a first modification.

In a first modification, the deflector 14 and the cap 15 are partially modified, as illustrated in FIG. 6. Specifically, in the first modification, the deflector 14 includes a disk portion 144 instead of the flat plate-shaped disk portion 142, and the cap 15 includes a disk portion 154 instead of the flat plate-shaped disk portion 152. The disk portions 144, 154 have a plurality of concavities and convexities formed along the circumferential direction. The disk portions 144, 154 having a plurality of concavities and convexities rotate about the axis thereof so as to easily repel, by the concavities and convexities, the foreign matter scattered from the space S. Further, the thus formed disk portions 144, 154 can suppress adhesion of the foreign matter. It is thus possible to prevent entry of the foreign matter toward the detection portion 131 of the stick sensor 13 from the space S on the driving wheel side and the driven wheel side. Other effects are similar to those of the illustrated embodiment.

Second Modification

In a second modification, the cap 15 is divided into a plurality of members. The plurality of members are joined to form the cap 15. The second modification exemplifies, as joining of the members, bonding of the members, more specifically, welding of the members.

Figure 7:
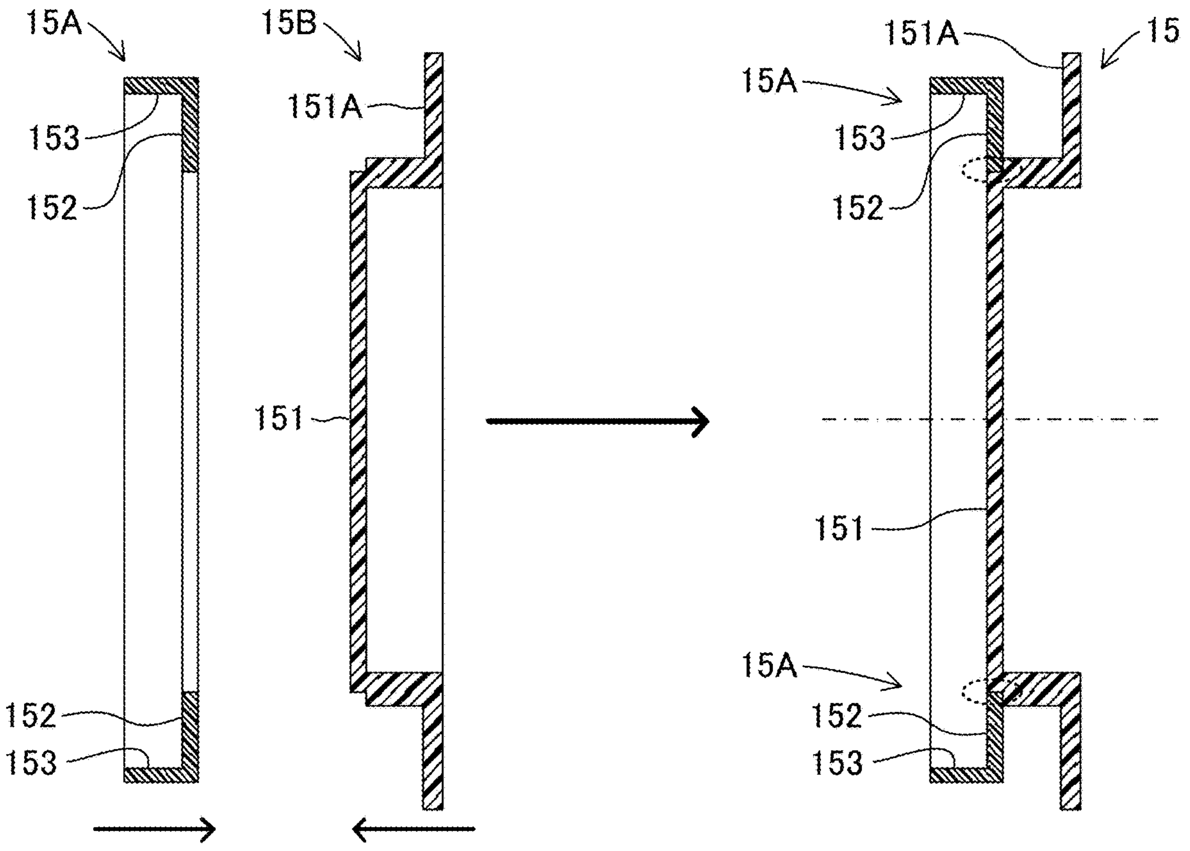
FIG. 7 is a view for explaining a cap according to a second modification.

In the second modification, the cap 15 is divided into two parts, i.e., the deflector member 15A including the disk portion 152 and the repelling portion 153 and a cap body member 15B including the cap body 151, as illustrated in FIG. 7. In the second modification, the deflector member 15A and the cap body member 15B are joined to each other to form the cap 15.

The deflector member 15A and the cap body member 15B are formed by injection molding in which a resin material is injected into a mold. As illustrated in FIG. 7, the deflector member 15A has a simple annular shape, and the cap body member 15B has a simple disk shape. Therefore, the deflector member 15A and the cap body member 15B can be formed by injection molding using a simple mold. Thus, in the second modification, the structure of the mold can be simplified, and the cost required for manufacturing can be reduced.

The deflector member 15A and the cap body member 15B are joined to each other to form the cap 15. In this case, the deflector member 15A and the cap body member 15B are bonded, that is, joined, at a position circled by the broken line in FIG. 7 by a method such as vibration welding so as to form the cap 15. The bonding of the deflector member 15A and the cap body member 15B is not limited to welding but may be bonding with an adhesive, for example.

Thus, the cap 15 constituted by the deflector member 15A and the cap body member 15B is attached to the hub bearing 12 in the same manner as in the illustrated embodiment, and the cap body 151 can prevent the foreign matter from entering the inside of the hub bearing 12 from the space S. The cap 15 constituted by the deflector member 15A and the cap body member 15B is attached to the hub bearing 12 in the same manner as in the illustrated embodiment, and the disk portion 152 and the repelling portion 153 corresponding to the deflector 14 can isolate the detection portion 131 in the space S.

Third Modification

Also in a third modification, the cap 15 is divided into a plurality of members. The plurality of members are joined to form the cap 15. The third modification also exemplifies, as joining of the members, bonding of the members, more specifically, welding of the members.

Figure 8:
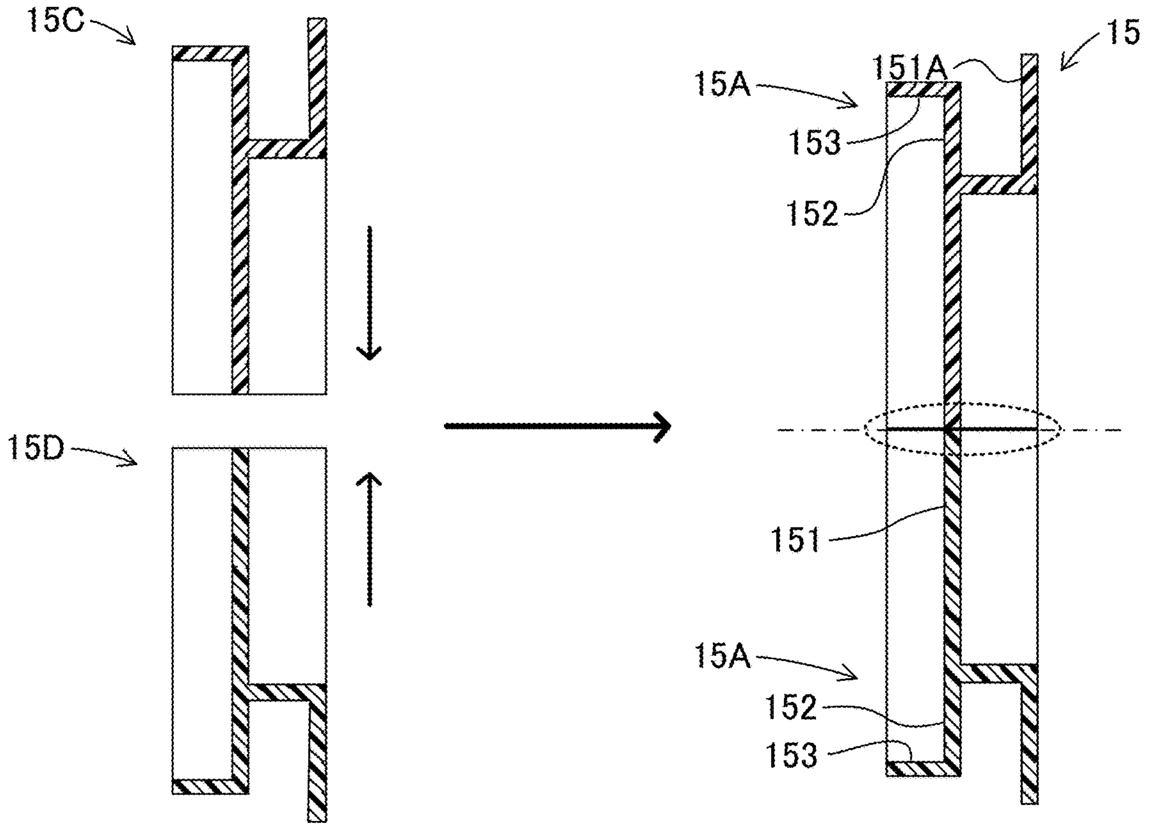
FIG. 8 is a view for explaining a cap according to a third modification.

In the third modification, the cap 15 is divided into two members, i.e., a first cap member 15C and a second cap member 15D, at an imaginary plane including the central axis of the cap 15, as illustrated in FIG. 8. The first cap member 15C and the second cap member 15D are joined to form the cap 15. The cap 15 may be divided into three or more members at the imaginary plane including the central axis of the cap 15.

The first cap member 15C and the second cap member 15D are formed by injection molding of a resin material. As illustrated in FIG. 8, the first cap member 15C and the second cap member 15D, which are obtained by halving the cap 15 along the central axis of the cap 15, can also be formed by injection molding using a simple mold, as in the second modification described above. Thus, also in the third modification, the structure of the mold can be simplified, and the cost required for manufacturing can be reduced.

The first cap member 15C and the second cap member 15D are joined to each other to form the cap 15. In this case, the first cap member 15C and the second cap member 15D are bonded to each other at a position circled by a broken-line in FIG. 8 by a method such as vibration welding to form the cap 15. The bonding of the first cap member 15C and the second cap member 15D is not limited to welding but may be bonding with an adhesive, for example.

The cap 15 constituted by the first cap member 15C and the second cap member 15D is attached to the hub bearing 12 in the same manner as in the illustrated embodiment, and the cap body 151 prevents the foreign matter from entering the inside of the hub bearing 12 from the space S. The cap 15 constituted by the first cap member 15C and the second cap member 15D is attached to the hub bearing 12 in the same manner as in the illustrated embodiment, and the disk portion 152 and the repelling portion 153 corresponding to the deflector 14 isolate the detecting portion 131 in the space S.

Fourth Modification

Also in a fourth modification, the cap 15 is divided into a plurality of members. The plurality of members are joined to form the cap 15. The fourth modification also exemplifies, as joining of the members, bonding of the members, more specifically, welding of the members.

Figure 9:
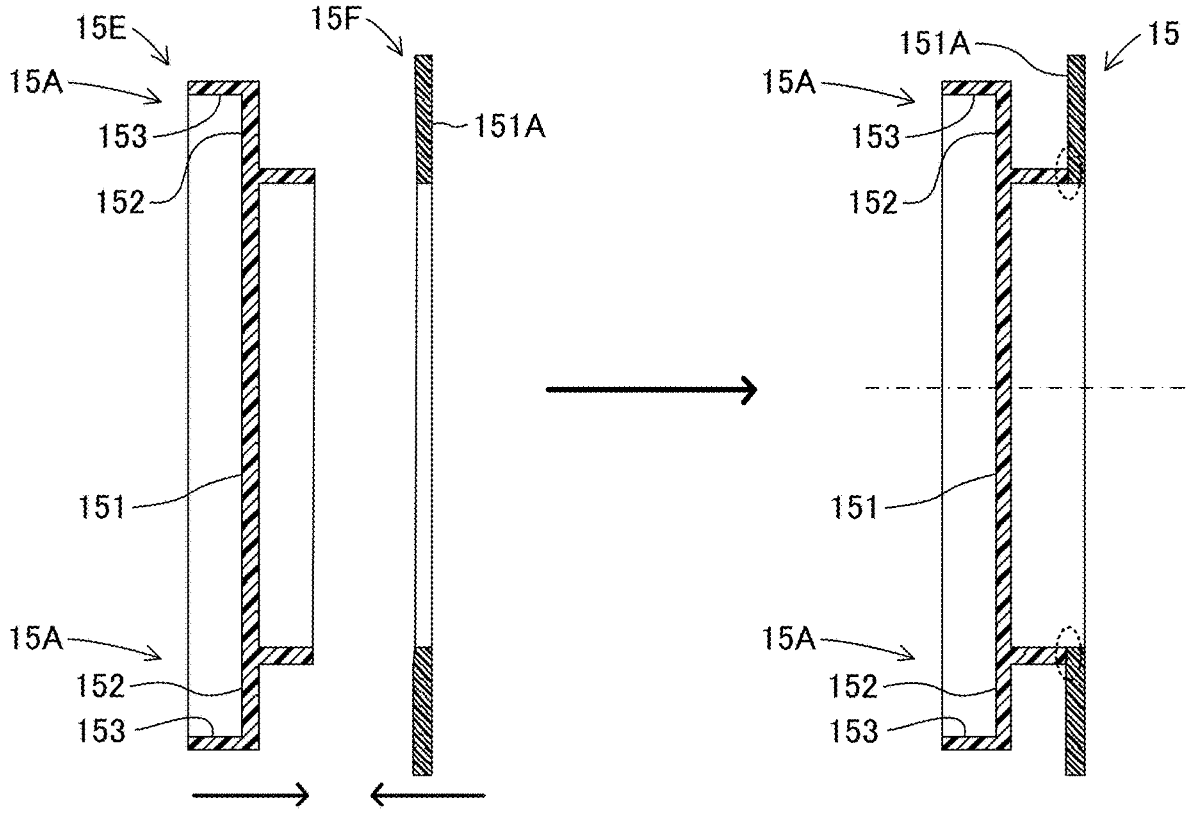
FIG. 9 is a view for explaining a cap according to a fourth modification.

In the fourth modification, as illustrated in FIG. 9, the cap 15 is divided into two parts, i.e., a cap main member 15E including: the disk portion 152, the repelling portion 153, and part of the cap body 151; and a fixing member 15F including the large diameter portion 151A that constitutes the cap body 151. In the fourth modification, the cap main member 15E and the fixing member 15F are joined to each other to form the cap body 151.

The cap main member 15E and the fixing member 15F are also formed by injection molding of a resin material. As illustrated in FIG. 9, the cap main member 15E has a simple disk shape, and the fixing member 15F has a simple annular shape. Thus, the cap main member 15E and the fixing member 15F can also be formed by injection molding using a simple mold, as in the second modification and the third modification described above. Also in the fourth modification, therefore, the structure of the mold can be simplified, and the cost required for manufacturing can be reduced.

The cap main member 15E and the fixing member 15F are joined to each other to form the cap 15. In this case, the cap main member 15E and the fixing member 15F are bonded to each other at a position circled by a broken-line in FIG. 9 by a method such as vibration welding, so that the cap 15 is formed. The bonding of the cap main member 15E and the fixing member 15F is not limited to welding but may be bonding with an adhesive, for example.

The cap 15 constituted by the cap main member 15E and the fixing member 15F is attached to the hub bearing 12 in the same manner as in the illustrated embodiment, and the cap body 151 prevents the foreign matter from entering the inside of the hub bearing 12 from the space S. The cap 15 constituted by the cap main member 15E and the fixing member 15F is attached to the hub bearing 12 in the same manner as in the illustrated embodiment, and the disk portion 152 and the repelling portion 153 corresponding to the deflector 14 isolate the detection portion 131 in the space S.

Fifth Modification

Figure 10:
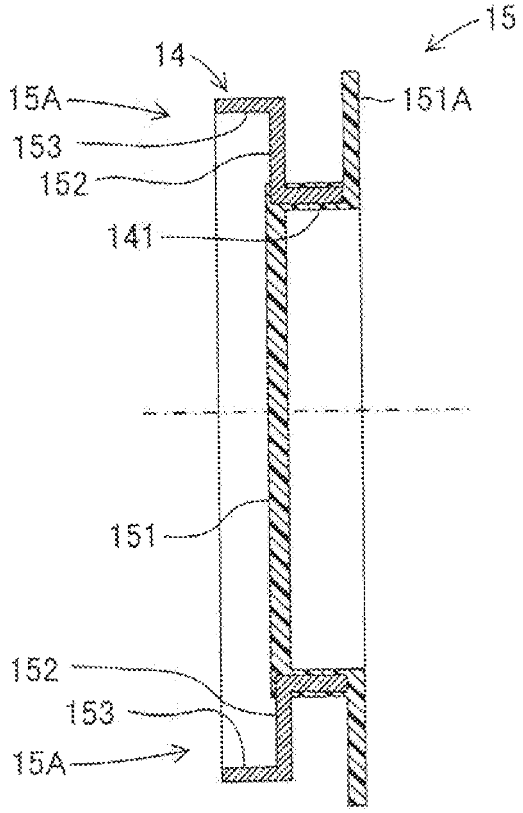
FIG. 10 is a view for explaining a cap according to a fifth modification.

In the illustrated embodiment and the first through fourth modifications described above, the cap 15 is formed of a resin material. In a fifth modification, at least part of the cap 15 is formed of a resin material. Specifically, as illustrated in FIG. 10, the cap body 151 of the cap 15 is made of resin using a resin material, and the disk portion 152 and the repelling portion 153 are made of metal using a metal material.

In the fifth modification, the deflector 14 made of metal and fixed to the drive shaft D on the driving wheel side is used on the driven wheel side. In the fifth modification, the deflector 14 made of metal is integrated with the cap body 151 by insert molding.

Specifically, the cap body 151 is formed by insert molding in which the deflector 14 made of metal is disposed at a predetermined position in a mold and a resin material is injected into the mold in this state. Thus, as illustrated in FIG. 10, the cylindrical portion 141 of the deflector 14 is covered with the resin material of the cap body 151, so that the deflector 14 and the cap body 151 are integrated with each other, that is, the cap 15 is formed.

In the fifth modification, the metal deflector 14 on the driving wheel side is used on the driven wheel side, that is, the deflector 14 can be used in common on the driving wheel side and the driven wheel side. Other effects are similar to those of the illustrated embodiment.

Sixth Modification

Figure 11:
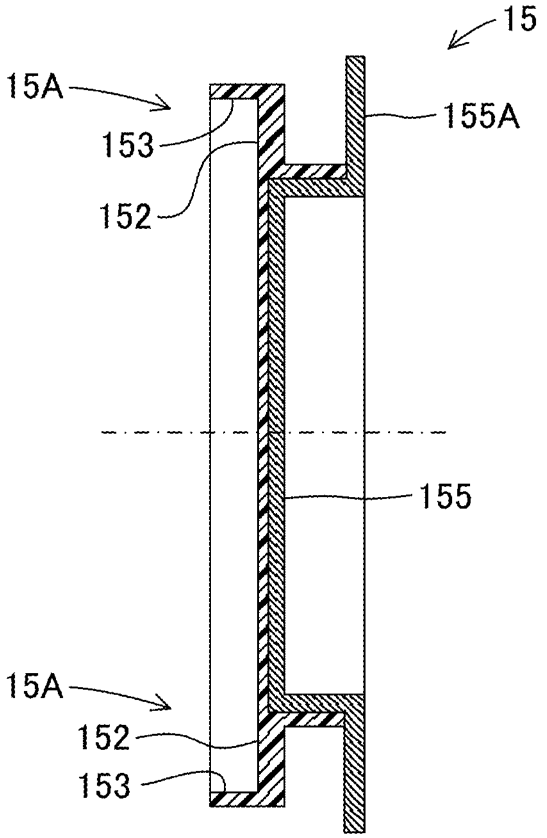
FIG. 11 is a view for explaining a cap according to a sixth modification.

The fifth modification described above exemplifies a case where the deflector 14 is made of metal and the cap body 151 of the cap 15 is made of resin as a case where part of the cap 15 is formed of a resin material. As the case where at least part of the cap 15 is formed of a resin material, there will be exemplified in a sixth modification a case where the disk portion 152 and the repelling portion 153 corresponding to the deflector 14 is made of resin and the cap body 155 made of metal is employed. Specifically, as illustrated in FIG. 11, the cap main body 155 is made of metal formed using a metal material, and the disk portion 152 and the repelling portion 153 corresponding to the deflector 14 are made of resin formed using a resin material.

In the sixth modification, the cap body 155 is formed by a press work of a thin steel plate, for instance. In the sixth modification, the cap body 155 made of metal is integrated, by insert molding, with the disc portion 152 and the repelling portion 153 made of resin.

Specifically, the cap body 155 made of metal is disposed at a predetermined position in a mold. In this state, a resin material is injected into the mold so as to form the disk portion 152 and the repelling portion 153 by insert molding. Thus, as illustrated in FIG. 11, a portion of the cap body 155 except the large diameter portion 155A is covered with the resin material of the disk portion 152 and the repelling portion 153, so that the cap 15 is formed.

In the sixth modification, it is possible to use a metal cap which has been conventionally employed on the driven wheel side. Other effects are similar to those of the illustrated embodiment.

Seventh Modification

Figure 12:
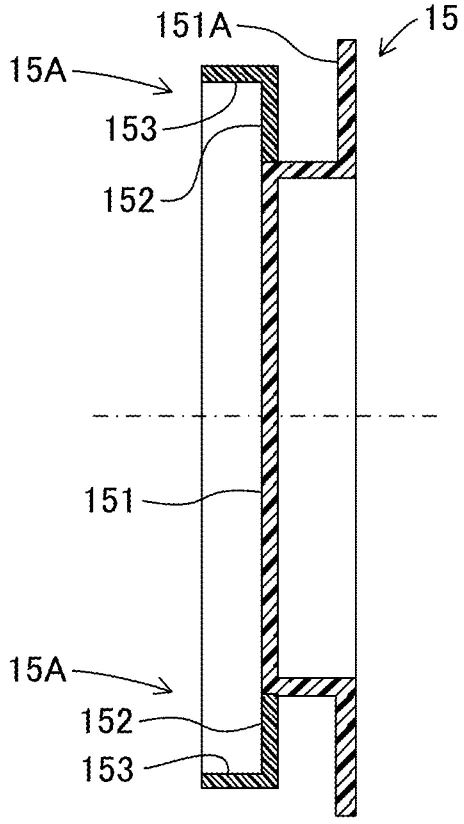
FIG. 12 is a view for explaining a cap according to a seventh modification.

In the illustrated embodiment and the first through fourth modifications described above, the entirety of the cap 15 is made of the same material. As illustrated in FIG. 12, the cap main body 151, which prevents the foreign matter from entering the inside of the hub bearing 12 from the space S, and the disk portion 152 and the repelling portion 153, which isolate the detection portion 131 of the sensor 13 in the space S, may be formed of different materials.

The seventh modification exemplifies a case where the cap main body 151 and the deflector member 15A including the disk portion 152 and the repelling portion 153 are formed by different-material molding in which different resin materials are injected into a mold. The different-material molding may be referred to as two-color molding or double molding.

Specifically, in the seventh modification, the cap main body 151 is formed by injecting, for example, an ABS resin or the like that is resistant to heat and impact into a portion of a mold where the cap main body 151 is to be formed. Subsequently, the disc portion 152 and the repelling portion 153, that is, the deflector member 15A, is formed by injecting, for example, a lightweight and hard polypropylene resin or the like into a portion of the mold where the disc portion 152 and the repelling portion 153 are to be formed.

Accordingly, the disc portion 152 and the repelling portion 153, which constitute the deflector member 15A, and the cap main body 151 are integrally formed in accordance with the use and the purpose. The cap 15 is formed by the different-material molding, thus enabling an improvement in workability of attaching the large diameter portion 151A of the cap 15 to the hub bearing 12 and a reduction in the cost required for manufacturing the cap 15, for instance. Other effects are similar to those of the illustrated embodiment.

Eighth Modification

In the illustrated embodiment and the modifications described above, the deflector member 15A, which is part of the deflector 14, is formed integrally with the cap 15. However, it is also possible to form the entire deflector 14 integrally with the cap 15, more specifically, the cap body 151.

In the eighth modification, the inner diameter of the cylindrical portion 141 of the deflector 14 is slightly smaller than the outer diameters of the stepped portion D1 of the drive shaft D (FIG. 1) and the cap body 151 (or the metal cap body 155). That is, the inner diameter of the cylindrical portion 141 has a dimension with an interference such that the cylindrical portion 141 is fitted to the stepped portion D1 and the cap body 151, 155.

Figure 13:
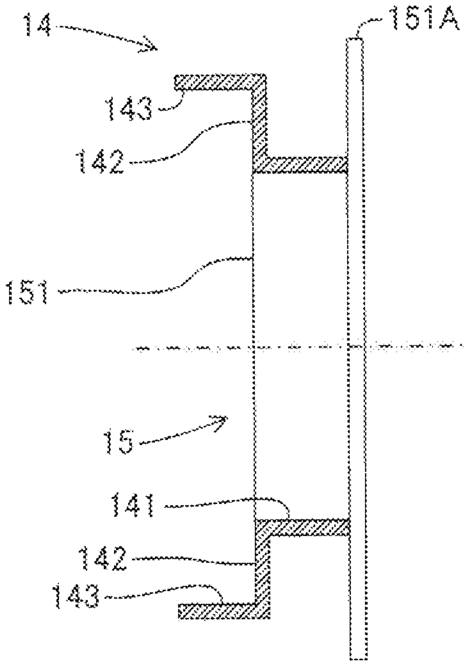
FIG. 13 is a view for explaining a cap according to an eighth modification.

In the eighth modification, as illustrated in FIG. 13, the deflector 14 is formed integrally with the cap 15 by fitting the cylindrical portion 141 to the cap main body 151, 155, e.g., by press-fitting the cylindrical portion 141 to the cap main body 151, 155. Since the outer diameters of the stepped portion D1 and the cap body 151, 155 are the same, the deflector 14 can be used in common between the driving wheel and the driven wheel. Other effects are similar to those of the illustrated embodiment.

Here, a vehicle wheel support device according to a first aspect of the present disclosure includes: a hub bearing that rotatably supports a wheel of a vehicle; a hub carrier that supports the hub bearing; a sensor that detects a rotation state of the wheel of the vehicle; and a cap which prevents entry of the foreign matter into the hub bearing and with which is formed integrally a deflector member including at least part of a deflector that isolates the sensor from the foreign matter.

A vehicle wheel support device according to a second aspect of the present disclosure is formed as follows. In the vehicle wheel support device according to the first aspect, the hub bearing constitutes part of a driving wheel in which a rotary body connected to the wheel and a drive shaft that transmits a driving force from a driving force source are connected to each other, the driving wheel being configured to drive the wheel, or the hub bearing constitutes part of a driven wheel in which the rotary body and the drive shaft are not connected, the driven wheel being configured to follow the driving wheel. The deflector is fixed to the drive shaft in the driving wheel, and the cap is attached to the hub bearing in the driven wheel.

A vehicle wheel support device according to a third aspect of the present disclosure is formed as follows. In the vehicle wheel support device according to the first aspect or the second aspect, the cap is divided into a plurality of members, and the members are joined together to form the cap.

A vehicle wheel support device according to a fourth aspect of the present disclosure is formed as follows. In the vehicle wheel support device according to the third aspect, the members are bonded to each other to form the cap.

A vehicle wheel support device according to a fifth aspect of the present disclosure is formed as follows. In the vehicle wheel support device according to the third aspect or the fourth aspect, the members are welded to each other to form the cap.

A vehicle wheel support device according to a sixth aspect of the present disclosure is formed as follows. In the vehicle wheel support device according to any one of the first aspect to the fifth aspect, the cap is formed by injection molding in which a resin material is injected into a mold.

A vehicle wheel support device according to a seventh aspect of the present disclosure is formed as follows. In the vehicle wheel support device according to any one of the first aspect to the fifth aspect, the cap is divided into the deflector member and a cap body, and the deflector member formed by injection molding in which a resin material is injected into a mold and the cap body formed by injection molding of a resin material are joined to each other to form the cap.

A vehicle wheel support device according to an eighth aspect of the present disclosure is formed as follows. In the vehicle wheel support device according to any one of the first aspect to the fifth aspect, the cap is divided into the deflector member and a cap body, and the deflector member and the cap body are integrally formed using different resin materials by different material molding in which the different resin materials are injected into a mold.

A vehicle wheel support device according to a ninth aspect of the present disclosure is formed as follows. In the vehicle wheel support device according to any one of the first aspect to the fifth aspect, at least part of the cap is formed using a resin material.

A vehicle wheel support device according to a tenth aspect of the present disclosure is formed as follows. In the vehicle wheel support device according to the ninth aspect, the cap has a cap body made of resin; and the deflector made of metal is integrated with the cap body made of resin by insert molding in which a resin material is injected into a mold in which the deflector made of metal is disposed.

According to a vehicle wheel support device according to an eleventh aspect of the present disclosure is formed as follows. In the vehicle wheel support device according to the ninth aspect, wherein the cap has a cap body made of metal, and the cap body made of metal is integrated with the deflector made of resin by insert molding in which a resin material is injected into a mold in which the cap body made of metal is disposed.

A vehicle wheel support device according to a twelfth aspect of the present disclosure is formed as follows. In the vehicle wheel support device according to any one of the first aspect to the eleventh aspect, the deflector or the cap has a plurality of concavities and convexities formed along a circumferential direction thereof.

A vehicle wheel support device according to a thirteenth aspect of the present disclosure is formed as follows. In the vehicle wheel support device according to any one of the first aspect to the twelfth aspect, the deflector or the cap has a repelling portion formed at an outer circumferential portion thereof, the repelling portion being configured to repel the foreign matter that enters the hub bearing.

A vehicle wheel support device according to a fourteenth aspect of the present disclosure is formed as follows. In the vehicle wheel support device according to any one of the first aspect to the thirteenth aspect, the hub bearing includes a rotary body connected to the wheel, the hub carrier includes an accommodating hole portion in which part of the hub bearing is accommodated and a fixing portion to which the sensor is fixed, and the sensor is fixed to the fixing portion in a state in which a detection portion of the sensor configured to detect a rotation state of the rotary body about an axis thereof protrudes from an inner surface of the accommodating hole portion.

What is claimed is:

1. A vehicle wheel support device, comprising:

a hub bearing that rotatably supports a wheel of a vehicle;

a hub carrier that supports the hub bearing;

a sensor that detects a rotation state of the wheel of the vehicle; and a cap which prevents entry of foreign matter into the hub bearing and with which is formed integrally a deflector member including at least part of a deflector that isolates the sensor from the foreign matter, wherein the cap is divided into a plurality of members, and wherein the members are joined together to form the cap.

2. The vehicle wheel support device according to claim 1, wherein the hub bearing constitutes part of a driving wheel in which a rotary body connected to the wheel and a drive shaft that transmits a driving force from a driving force source are connected to each other, or the hub bearing constitutes part of a driven wheel in which the rotary body and the drive shaft are not connected, and the driven wheel follows the driving wheel, wherein the deflector is fixed to the drive shaft in the driving wheel, and wherein the cap is attached to the hub bearing in the driven wheel.

3. The vehicle wheel support device according to claim 1, wherein the members are bonded to each other to form the cap.

4. The vehicle wheel support device according to claim 3, wherein the members are welded to each other to form the cap.

5. The vehicle wheel support device according to claim 1, wherein the cap is formed by injection molding in which a resin material is injected into a mold.

6. The vehicle wheel support device according to claim 1,
wherein the cap is divided into the deflector member and a cap body, and
wherein the deflector member, formed by injection molding in which a resin material is injected into a mold, and the cap body, formed by injection molding of a resin material, are joined to each other to form the cap.

7. A vehicle wheel support device, comprising:
a hub bearing that rotatably supports a wheel of a vehicle;
a hub carrier that supports the hub bearing;
a sensor that detects a rotation state of the wheel of the vehicle; and
a cap which prevents entry of foreign matter into the hub bearing and with which is formed integrally a deflector member including at least part of a deflector that isolates the sensor from the foreign matter,
wherein the cap is divided into the deflector member and a cap body, and
wherein the deflector member and the cap body are integrally formed using different resin materials by different material molding in which the different resin materials are injected into a mold.

8. The vehicle wheel support device according to claim 1, wherein at least part of the cap is formed using a resin material.

9. The vehicle wheel support device according to claim 8,
wherein the cap has a cap body made of resin; and
wherein the deflector made of metal is integrated with the cap body made of resin by insert molding in which a resin material is injected into a mold in which the deflector made of metal is disposed.

10. The vehicle wheel support device according to claim 8,
wherein the cap has a cap body made of metal, and
wherein the cap body made of metal is integrated with the deflector made of resin by insert molding in which a resin material is injected into a mold in which the cap body made of metal is disposed.

11. The vehicle wheel support device according to claim 1, wherein the deflector or the cap has a plurality of concavities and convexities formed along a circumferential direction thereof.

12. The vehicle wheel support device according to claim 1, wherein the deflector or the cap has a repelling portion formed at an outer circumferential portion thereof, the repelling portion extending axially toward a vehicle inner side from the outer circumferential edge thereof.

13. The vehicle wheel support device according to claim 1,
wherein the hub bearing includes a rotary body connected to the wheel,
wherein the hub carrier includes an accommodating hole portion in which part of the hub bearing is accommodated and a fixing portion to which the sensor is fixed, and
wherein the sensor is fixed to the fixing portion such that a detection portion of the sensor configured to detect a rotation state of the rotary body about an axis thereof protrudes from an inner circumferential surface of the accommodating hole portion.

* * * * *